US008826268B2

(12) United States Patent
Jacobson et al.

(10) Patent No.: US 8,826,268 B2
(45) Date of Patent: Sep. 2, 2014

(54) VIRTUAL SOFTWARE APPLICATION DEPLOYMENT CONFIGURATIONS

(75) Inventors: Neil Jacobson, Arlington, MA (US); Jeremy E. Dunker, Boston, MA (US); Eric C. Jewart, Waltham, MA (US); John M. Sheehan, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 12/719,008

(22) Filed: Mar. 8, 2010

(65) Prior Publication Data

US 2011/0219146 A1 Sep. 8, 2011

(51) Int. Cl.
G06F 9/445 (2006.01)

(52) U.S. Cl.
CPC .................................. G06F 8/60 (2013.01)
USPC .......................................................... 717/174

(58) Field of Classification Search
CPC ................ G06F 8/60; G06F 8/61; G06F 8/71
USPC ................... 717/120–123, 168–178
See application file for complete search history.

(56) References Cited

U.S. PATENT DOCUMENTS

| 7,228,537 | B2* | 6/2007 | Murray | 717/168 |
|---|---|---|---|---|
| 7,774,774 | B1* | 8/2010 | Mulligan et al. | 717/174 |
| 8,572,580 | B2* | 10/2013 | Sheehan et al. | 717/131 |
| 8,635,611 | B2* | 1/2014 | Criddle et al. | 717/177 |
| 2002/0049615 | A1* | 4/2002 | Huber | 705/3 |
| 2003/0046444 | A1* | 3/2003 | Murray | 709/320 |
| 2004/0148184 | A1* | 7/2004 | Sadiq | 705/1 |
| 2005/0080811 | A1 | 4/2005 | Speeter et al. | |
| 2005/0138068 | A1* | 6/2005 | Wilbur et al. | 707/104.1 |
| 2006/0245354 | A1* | 11/2006 | Gao et al. | 370/230 |
| 2007/0271552 | A1* | 11/2007 | Pulley | 717/120 |
| 2009/0037879 | A1* | 2/2009 | Iyengar et al. | 717/121 |
| 2009/0044170 | A1 | 2/2009 | Bernardi et al. | |
| 2009/0070792 | A1 | 3/2009 | Cable | |
| 2009/0119660 | A1 | 5/2009 | Redpath | |
| 2009/0133013 | A1 | 5/2009 | Criddle et al. | |
| 2009/0320019 | A1 | 12/2009 | Ellington et al. | |
| 2010/0023934 | A1 | 1/2010 | Sheehan et al. | |
| 2010/0042988 | A1* | 2/2010 | Lundin et al. | 717/176 |
| 2010/0058319 | A1 | 3/2010 | Kawaguchi et al. | |
| 2011/0219365 | A1* | 9/2011 | Foxman et al. | 717/168 |

OTHER PUBLICATIONS

Heimbigner et al., "Post-Deployment Configuration Management," 1996, Lecture Notes in Computer Science, vol. 1167/1996, pg. 272-276.*

(Continued)

*Primary Examiner* — Qing Chen
(74) *Attorney, Agent, or Firm* — Jim Sfekas; Kate Drakos; Micky Minhas (57) ABSTRACT

Configuration items for a software application can be automatically and/or manually discovered, and the application can be packaged to form a virtual application package. A deployment configuration can include settings for the configuration items. The deployment configuration can be set after packaging the software application. For example, a selected configuration item in the deployment configuration may be changed in response to user input. The virtual application package can be deployed to instantiate the application one or more times, and the deployment configuration can be applied in the instantiated application.

20 Claims, 5 Drawing Sheets

(56) References Cited

OTHER PUBLICATIONS

International Search Report, Intl Application No. PCT/US20111027300, Int'l Filing Date: Mar. 4, 2011, Mailing Date: Oct. 24, 2011, pp. 9.

"ASP.NET Web Application Projects Deployment Overview", Retrieved at <<http://msdn.microsoft.com/en-us/library/dd394698(VS.100).aspx>>, 2010, pp. 4.

"Introduction to JavaEE Packaging", Retrieved at <<http://www.buildmeister.com/articles/introduction_to_javaee_packaging>>, Nov. 15, 2007, pp. 6.

"Basic Requirements of a JavaServer Faces Application", Retrieved at <<http://java.sun.com/javaee/5/docs/tutorial/doc/bnaxj.html>>, Jan. 8, 2010, pp. 7.

"Packaging and Deployment Overview", Retrieved at http://pylonshq.com/docs/en/0.9.7/deployment/>>, Jan. 8, 2010, pp. 12.

* cited by examiner

VIRTUAL SOFTWARE APPLICATION DEPLOYMENT CONFIGURATIONS

BACKGROUND

Virtual applications can be implemented in a series of operations. Initially, an application can be packaged in a packaging environment to generate a virtual application package. Packaging is the process of taking the application and defining its data (such as files and registry entries) and metadata (configuration items such as items in *.ini files and registry settings), so that the package can include the application data and metadata to run in a target environment without actually being installed as a native application. Accordingly, that package can be deployed to a target environment to instantiate a virtual application instance. The virtual application instance can run in a capsule, which includes the application as well as virtual resources to run the application. Such a capsule is referred to herein as a "sandbox". As used herein, a package includes the information (files, metadata, etc.) that is taken from the packaging of the application, and the package can be deployed to instantiate the application. The package may be split into multiple parts, and some parts may be transmitted in different ways and/or at different times.

SUMMARY

The tools and techniques described and claimed herein can allow a virtual application package and a deployment configuration to be deployed to instantiate a specific instance of an application. The deployment configuration can include one or more configuration items, such as items that are discovered when packaging the application. The deployment configuration may be included with or separate from the virtual application package, and the deployment configuration may be edited after the application is packaged. The deployment configuration can be applied in the instantiated virtual application. For example, the deployment configuration may be applied to configure the application while deploying the application and/or after the application has been deployed.

In one embodiment, the tools and techniques can include automatically discovering configuration items for a software application, and packaging the application to form a virtual application package. The virtual application package can be deployed to instantiate the application. A deployment configuration can be applied in the instantiated application, where the deployment configuration includes settings for the configuration items.

In another embodiment of the tools and techniques, a software application can be packaged to form a virtual application package. A deployment configuration for the application can be set after packaging the application. Setting a deployment configuration includes confirming and/or changing the configuration. For example, one or more default settings for configuration items in the deployment configuration can be confirmed automatically or in response to specific user input. As another example, one or more settings for configuration items can be added or modified, such as adding or modifying automatically or in response to specific user input. The virtual application package can also be deployed to instantiate the application, and the deployment configuration can be applied in the instantiated application. For example, settings of configuration items in the deployment configuration may be applied in the application while the application package is being deployed (e.g., by interleaving deployment and configuration operations), and/or after the application package has been deployed.

In yet another embodiment of the tools and techniques, configuration items for a software application can be discovered. The application can be packaged to form a virtual application package. After packaging the application, the configuration items can be presented with a user interface device. A selected configuration item can be changed in response to user input indicating the change. Additionally, the virtual application package can be deployed to instantiate the application, and the configuration items can be applied to the instantiated application.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved packaging, deployment, and/or instantiation of virtual applications. Such improvements may result from the use of various techniques and tools separately or in combination.

Such techniques and tools may include allowing a virtual application package and a deployment configuration to be deployed to instantiate a specific instance of an application in a target environment. For example one or more configuration items for a software application may be automatically discovered. A deployment configuration that includes the items can be set after an application is packaged as a virtual application package. For example, the configuration item(s) may be presented to a user with a user interface device (e.g., by displaying representations of the configuration item(s) on a computer display) after packaging the application. Also after the packaging, one of the configuration item(s) may be changed in response to user input indicating the change to be made. The package can be deployed to instantiate an instance of the application, and the deployment configuration can be applied in the application instance.

At packaging time a packaging engineer (user conducting packaging) and/or the packager (computing component that performs packaging) may know what some configuration items are, but may not know what the settings for those configuration items are to be in a specific application instance. For example, some configuration items may be tied to a particular machine, user or application instance. As one specific example, a user acceptance testing organization may have the application connect to a database named "sq1_qa". However, when the application is run in its intended production target environment, the application may connect to a database named "sq1_production". By identifying the configuration items at packaging time, but setting and applying those configuration items when deploying the package to instantiate a specific instance of the application, an administrator (user conducting deployment) conducting the deployment can be relieved of having to identify the configuration items. However, the administrator can still enter appropriate settings for the configuration items. Also, a single package can be deployed to instantiate different instances with different machines and/or users. This may be done without having to modify the package itself (except possibly modifying the configuration items if they are included in the package) and without having to repackage the application. For example, this may be beneficial because one general package can be packaged and tested, but this tested general package can be deployed to a number of different instances with different deployment configuration settings. If items in the package other than the deployment configuration were modified for each deployment or if the application were entirely repackaged, the original testing may not be valid.

Accordingly, one or more substantial benefits can be realized from the tools and techniques described herein. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
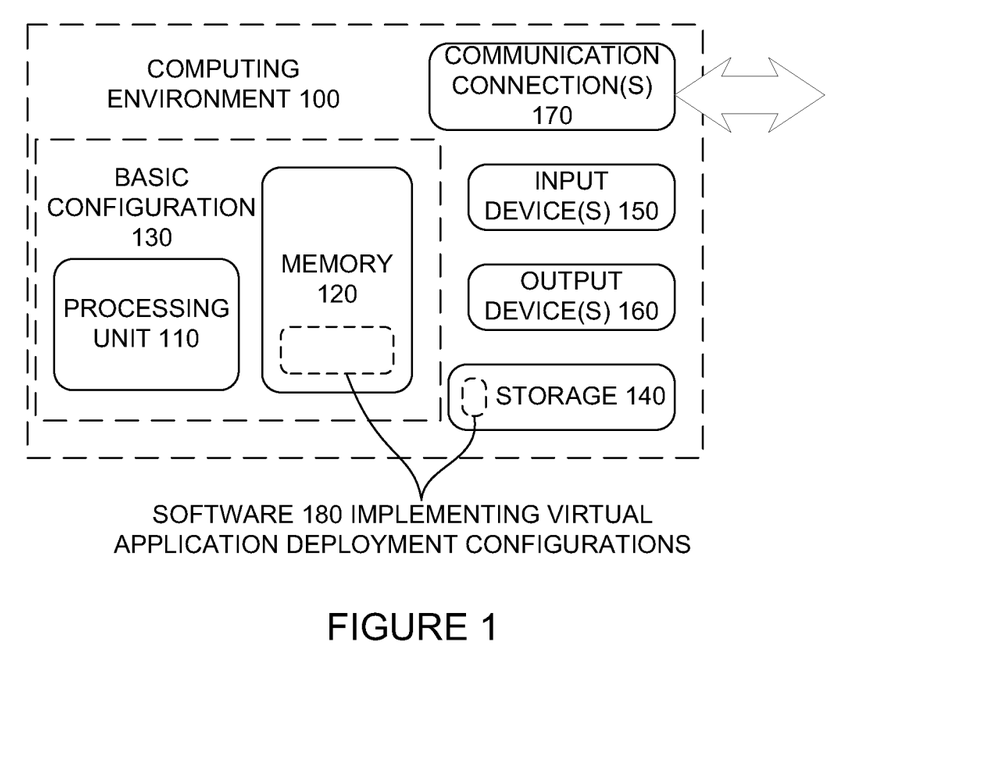
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a packaging environment, deployment environment, and/or target environment. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing virtual software application deployment configurations.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
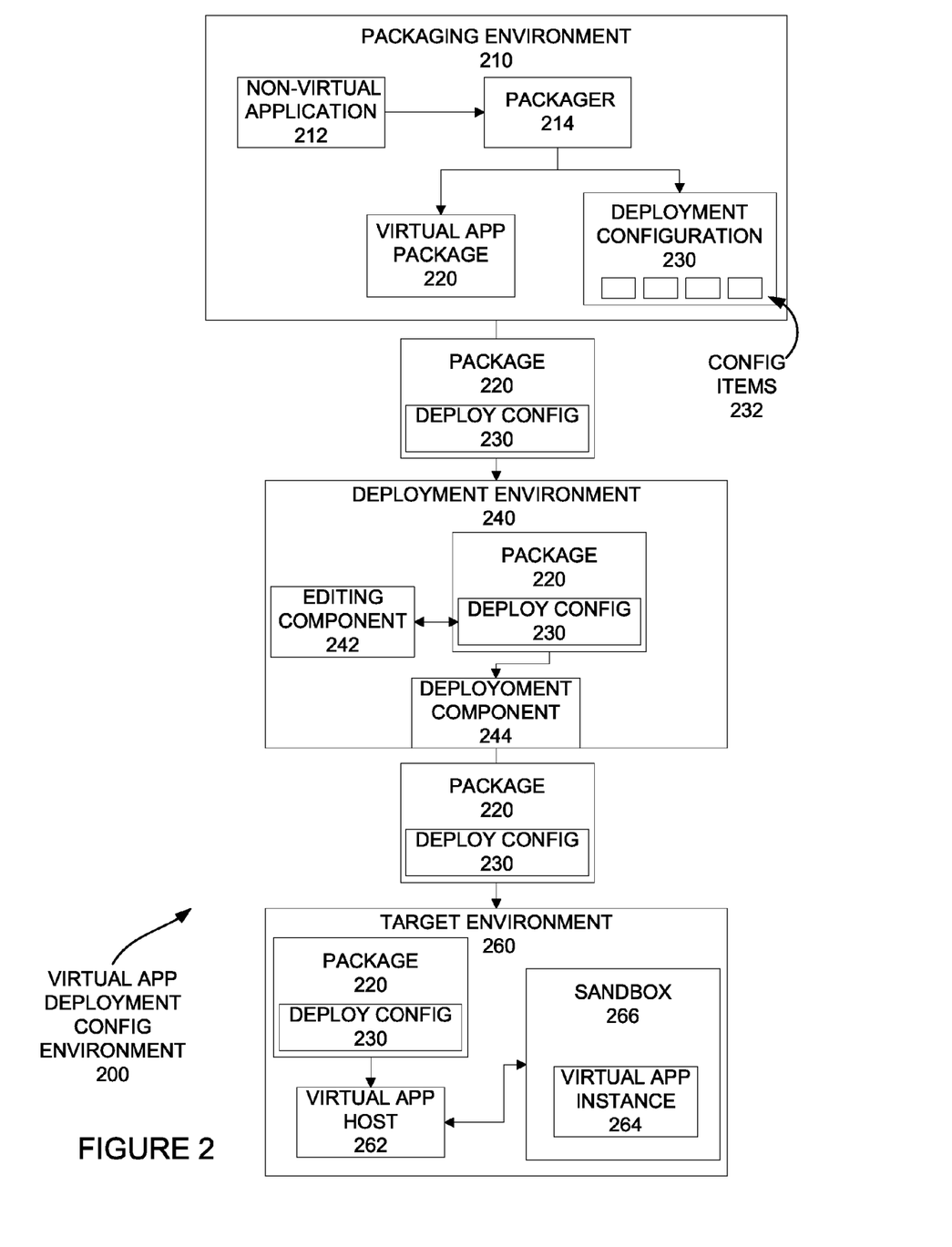
FIG. 2 is a block diagram of a virtual application deployment configuration computing environment.

II. Virtual Software Application Deployment Configuration System and Environment FIG. 2 is a block diagram of a virtual software application deployment configuration computing environment (200) in conjunction with which one or more of the described embodiments may be implemented. The computing environment (200) can include a packaging environment (210). In the packaging environment (210), a non-virtual application (212) can be packaged by a packager (214) into a virtual application package (220). For example, the packager (214) may be a packager from application virtualization software such as Microsoft's Application Virtualization (App-V) software. When packaging the application (212), the packager (214) can also identify in the non-virtual application (212) one or more configurations to be included in a deployment configuration (230) as configuration items (232). The identification may be done automatically (i.e., the searching and identification may be automatic, although this automatic identification may be prompted by user input requesting that the configuration items be automatically identified). In addition, the packager (214) may suggest whether one or more of the configuration items (232) are to be mandatory configuration items that have to be set in response to user input at deployment time, or optional configuration items that may or may not be set in response to user input at deployment time. The identification of the configuration items (232), as well as the determination of whether to suggest that the items be optional or mandatory may be delegated to subsystems of the packager (214). The deployment configuration (230) may be in the form of a separate file, such as an XML file with configuration items indexed by location (e.g., file or registry location). Alternatively, the deployment configuration (230) may be in some other form, such as in multiple files and/or attributes in one or more files that also include other application data and/or metadata.

The configuration items (232) may also be presented to a user on a user interface device, such as one of the output device(s) (160) discussed above with reference to FIG. 1. The user may provide user input to edit one or more of the configuration items (232) in the deployment configuration (230), and the configuration items (232) can be edited in response to the user input. For example, a user may provide user input requesting that one of the items (232) be deleted from the deployment configuration (230); that a name or label for one of the items (232) be changed; that a mandatory item (232) be changed to an optional item (232); that an optional item (232) be changed to a mandatory item (232); that a default setting for an item (232) be added, changed or deleted; or that some other change to one or more of the items (232) be made.

Some specific types of configuration items (232) will now be discussed. However, these specific types are only provided as examples; other types of configuration items (232) may be identified and included in the deployment configuration (230) in addition to or instead of these types of items. As one example, a configuration item may be a database connection string. For example, the packager (214) may delegate automatic identification of database-related items to a database subsystem of the packager (214). The database subsystem may search for database-related items. For example, the database subsystem may monitor API (application programming interface) calls when the non-virtual application (212) is being installed, and extract particular strings from those calls. The database subsystem can then produce configuration items or search for items related to those extracted strings in the application state, such as in application files (e.g., *.ini and xml files) and registry entries. When the string is found, the database subsystem can identify the string as a configuration item (232). The subsystem may also make other determinations related to the configuration item (232), such as whether the item (232) is mandatory or optional, what the name of the item is, and what, if any, default setting is to be included for the configuration item (232). The packager (214) can include the configuration item (232) in the deployment configuration (230). This inclusion can be performed by the database subsystem or some other more general component that is configured for including configuration items (232) in the deployment configuration (230). For example, if the database connection string "mydb" were found in a registry entry "HKLM\foo\app' odbcdatabase=mydb", the packager (214) may store an entry "HKLM\foo\app, value odbcdatabase=mydb" in the deployment configuration (230). Similar entries could be used for other items such as xml and *.ini elements. For example, for a configuration item (232) that is an xml element, the packager (214) may store the file path and an XPath expression to identify the location, allowing differentiation between elements with the same name. As another example, the packager (214) may store an entry such as "approot\config\db.xml element 'db'=mydb" in the deployment configuration (230).

As another example, a configuration item (232) may be an account name for NT services, and a subsystem of the packager (214) that deals with NT services could identify the account name. The account name may be listed in the deployment configuration (230) by an identifier, which an NT services component will recognize when instantiating the application. For example, the account name may be set by an API call. As other examples of types of configuration items, configuration items (232) may include user accounts and passwords that are managed by Microsoft's Internet Information Services (IIS). An IIS subsystem of the packager (214) can recognize user accounts and passwords managed by IIS, and the packager (214) can include configuration items for the accounts and passwords in the deployment configuration (230), listed by appropriate identifiers.

The package (220), which can include the deployment configuration (230), can be sent to a deployment environment (240). In the deployment environment (240), the deployment configurations (230) can be presented to a user, and the deployment configurations can be set (such as by confirming default settings, editing the settings, etc.). For mandatory configuration items (232), the settings may have to be confirmed and/or edited in response to user input before deployment of the package (220) will be allowed to proceed. As an example, the deployment configuration (230) may be included in a file (e.g., an xml file), and the file can be opened and displayed as a document to be edited. Alternatively, a graphical representation of the deployment configuration can be presented (e.g., the configuration items (232) can be presented in one or more dialogs). User input can be received (e.g., from an administrator conducting deployment of the package (220)), and in response to the user input, an editing component (242) can edit the configuration items (232) in the deployment configuration (230), as indicated by the user input. A deployment component (244) can take the package and deploy it to a target environment (260). The deployment component (244) and the editing component (242) may both be part of the same software product or part of different software products. For example, the editing component (242) and a component for presenting the deployment configuration on a user interface device may be part of a data center manager software product, while the deployment component (244) may be part of an application virtualization software product. As another example, where an XML-based deployment configuration file is used, the editing component (242) can be a simple editor such as a generic XML editor, which can be used to directly view and edit the deployment configuration file.

As noted above, the package (220) can be deployed to the target environment (260) to be instantiated. For example, the instantiation in the target environment (260) can be conducted by a virtual application host (262), which can be a client component of application virtualization software that also includes the editing component (242) and the packager (214). Specifically, the application can be instantiated as a virtual application instance (264) in a sandbox (266) in the target environment (260). The configuration items (232) in the deployment configuration (230) can be applied in the virtual application instance (264) (i.e., the instantiated application). For example, the entire application may be deployed and then configured as the virtual application instance (264). As an alternative, the deployment of the package (220) and the configuration of the virtual application instance (264) can be interleaved, with a portion of the package (220) being deployed and configured, followed by another portion of the package (220) being deployed and configured, etc. This interleaved deployment and configuration can continue until the entire application is instantiated as the virtual application instance (264).

Applying the deployment configuration (230) may be done in various ways, such as overwriting metadata and/or making API calls to configure the application instance (264). This configuring may be done in the deployment environment (240) and/or in the target environment (260). As another example, the virtual application can be left in an unconfigured state in storage. The deployment configuration information can be merged with the application information at runtime. For example, when an application opens an *.ini file, the *.ini file can be read from storage and merged with deployment configuration item(s). The merged result can be given to the application for consumption. As another example, API calls can be hooked and the behavior of the API calls can be changed to return the values from the deployment configuration (230) at runtime. For example, registry API's can be hooked to detect when the virtual process for the virtual application instance (264) is reading a registry value that has been overridden by a deployment configuration item (232). When that occurs, the value from the deployment configuration item (232) can be returned instead of the value in the registry.

The identification, editing, and/or application of the deployment configuration (230) could be done in environments that differ from the computing environment (200) discussed above. For example, the virtual application package (220) could be deployed directly from the packaging environment (210) to the target environment (260). Indeed, packaging, deployment, instantiation, and execution of the virtual application may all be done in the same environment.

III. Virtual Software Application Deployment Configuration Techniques

Several virtual software application deployment configuration techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
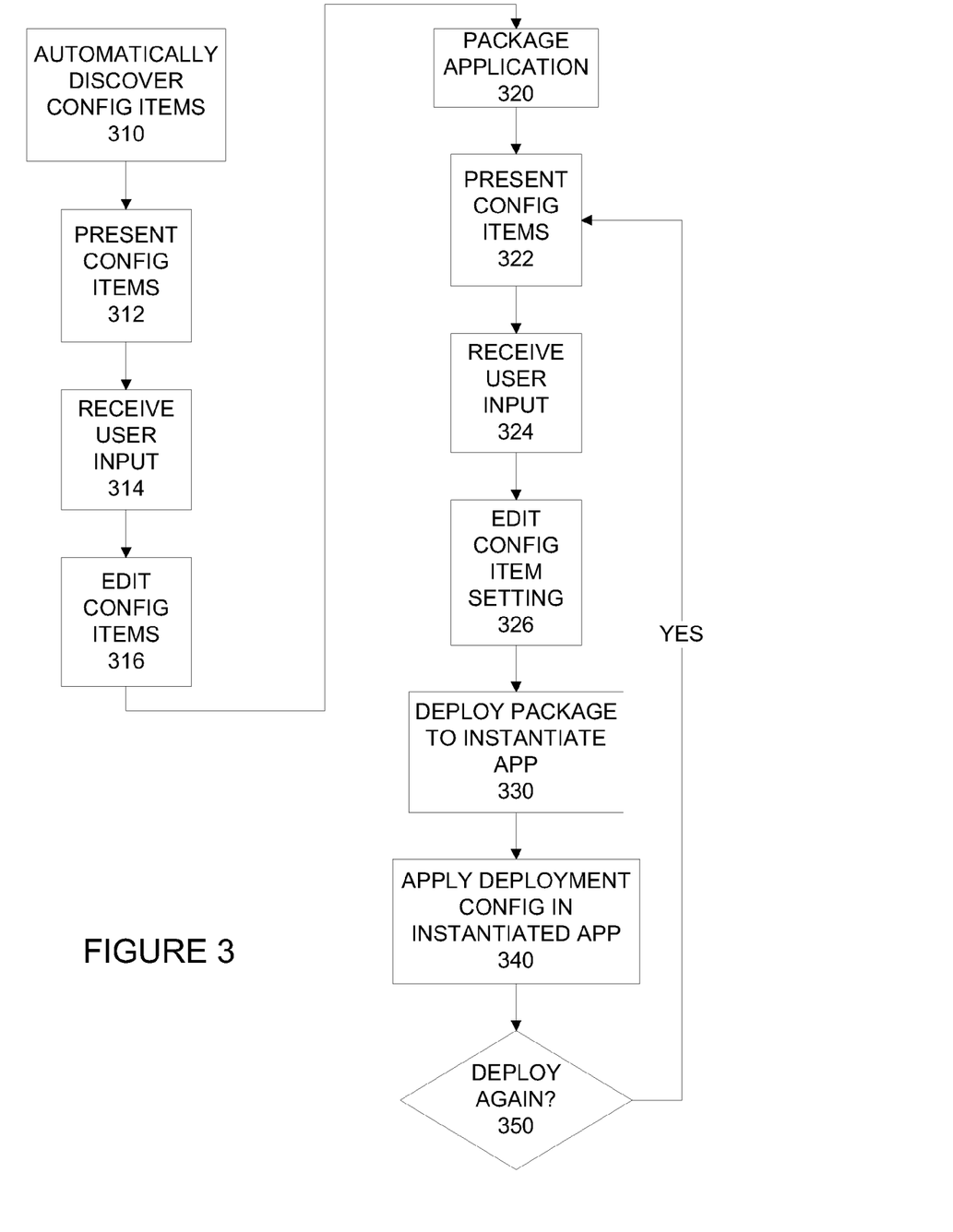
FIG. 3 is a flowchart of a virtual application deployment configuration technique.

Referring to FIG. 3, a virtual software application deployment configuration technique will be discussed. The technique can include automatically discovering (310) one or more configuration items for a software application. The configuration item(s) may be presented (312) with a user interface device. User input may be received (314), and in response to receiving (314) the user input, one of the configuration item(s) can be edited (316). For example, this changing or editing (316) of the configuration may include deleting the configuration item, modifying a name or label associated with the configuration item, or deleting, adding, or modifying a setting for the configuration item. The application can be packaged (320) to form a virtual application package.

After packaging (320) the application, the configuration item(s) may again be presented (322) with a user interface device. Also after packaging (320), user input can be received (324), and one or more configuration item settings can be edited (326). Other features of the configuration item(s) may also be edited at that time. Accordingly, the presentation of configuration item(s), receipt of user input, and responsive editing may be done before packaging (320) is complete (e.g., at packaging time) and/or after packaging (320) (e.g., at deployment time) is complete. In addition, the package may be deployed (330) to instantiate the application. A deployment configuration, which can include one or more settings for the configuration item(s), can be applied (340) in the instantiated application. If it is determined (350) that the package is to be deployed again, then presenting (322) configuration item(s), receiving (324) user input, editing (326)

configuration item setting(s), deploying (330) the package, and applying (340) the deployment configuration can be performed again.

The technique can also include applying a second deployment configuration in the instantiated application to change setting(s) for the configuration item(s). Applying the second deployment configuration can be done after the instantiated application has been configured with the original deployment configuration. This other deployment configuration can be different from the first deployment configuration, so that the instantiated application can be reconfigured by applying the second deployment configuration. Moreover, technique can also include discovering one or more configuration items for the software application in response to user input that identifies the item(s), and the deployment configuration can further include one or more settings for these manually-discovered configuration item(s).

Accordingly, the same package may be deployed to instantiate the application multiple times, with different deployment configuration settings being applied to in different instances of the application. For example, the application may be deployed to be instantiated in multiple target environments with different deployment configuration settings for target environments that are configured differently. Accordingly, deploying (330) the virtual application package to instantiate the application can include deploying the virtual application package to instantiate the application as a first instance of the application, and applying (340) the deployment configuration can include applying the deployment configuration in the first instance of the application. The technique can further include deploying (330) the virtual application package to instantiate the application as a second instance of the application, and applying (340) the deployment configuration in the second instance of the application. Also, applying (340) the deployment configuration in the first instance of the application and applying (340) the deployment configuration in the second instance of the application can include applying different settings for at least one of the configuration item(s) in the first and second instances of the application.

Figure 4:
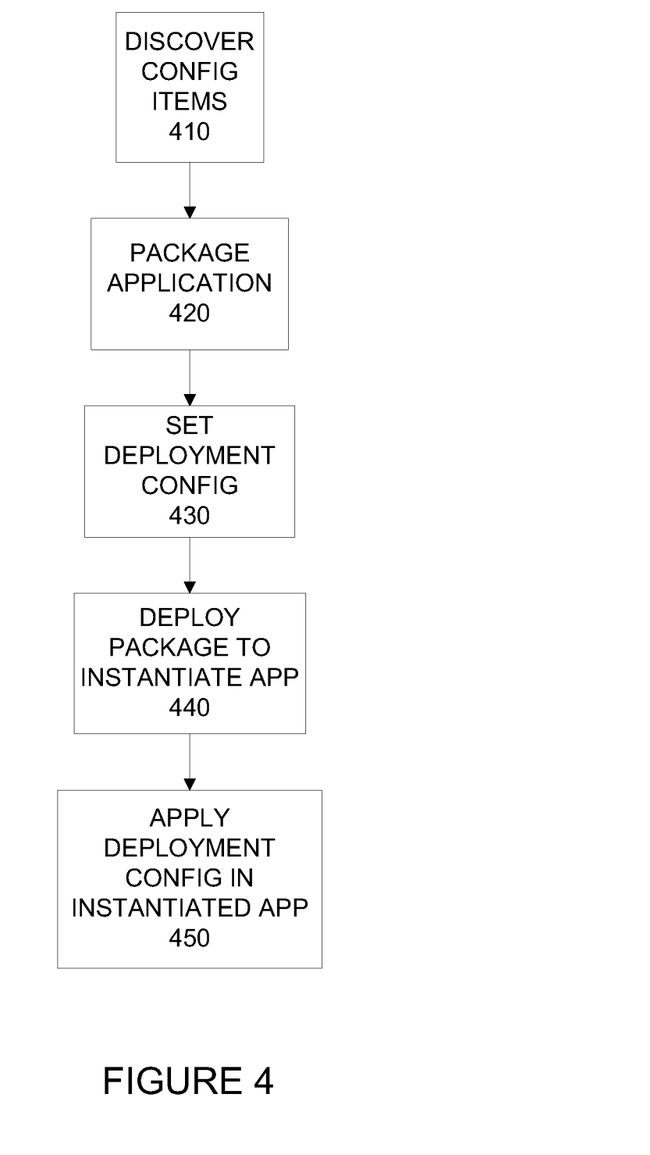
FIG. 4 is a flowchart of another virtual application deployment configuration technique.

Referring now to FIG. 4, another virtual software application deployment configuration technique will be discussed. The technique can include discovering (410) one or more configuration items for a deployment configuration, and packaging (420) a software application to form a virtual application package. The discovering (410) can be performed before completing the packaging (420). For example, the discovering (410) may be performed during packaging (420) and/or prior to packaging (420). However, discovering (410) may be performed after packaging (420) is completed, such as by using a tool that scans a package to identify and/or produce a deployment configuration document. The technique can also include setting (430) a deployment configuration for the virtual application package after packaging (420). Setting (430) the deployment configuration can include editing one or more configuration items in the deployment configuration (e.g., by editing setting(s) for the configuration item(s)) and/or confirming existing configuration item(s) in the deployment configuration. For example, setting (430) the deployment configuration can be done in response to receiving user input. At least one of the configuration item(s) may be marked as optional or mandatory. Setting (430) the deployment configuration can include determining for each of the configuration item(s) whether the item is marked as mandatory, and if so then requiring user input for that item before deploying the virtual application package. For example, such user input may confirm an existing default setting, modify an existing default setting, or enter a setting where there is no default setting. In addition, the virtual application package can be deployed (440) to instantiate the application, and the deployment configuration can be applied (450) in the instantiated application.

The package may be deployed multiple times, possibly with different deployment configurations for different deployments. Accordingly, the deployment configuration can be a first deployment configuration. Deploying (440) the virtual application package to instantiate the application can include deploying the virtual application package to instantiate the application in a first instance of the application. Moreover, applying (450) the deployment configuration in the instantiated application can include applying the first deployment configuration in the first instance of the application. Moreover, the technique can further include setting a second deployment configuration for the virtual application package after packaging the software application, deploying the virtual application package to instantiate the application in a second instance of the application; and applying the second deployment configuration in the second instance of the application. The first instance of the application can be on a first machine with a first machine configuration and the second instance of the application can be on a second machine with a second machine configuration. Alternatively, the first and second instances of the application could be on the same machine, or on different machines that both have the same configuration.

Figure 5:
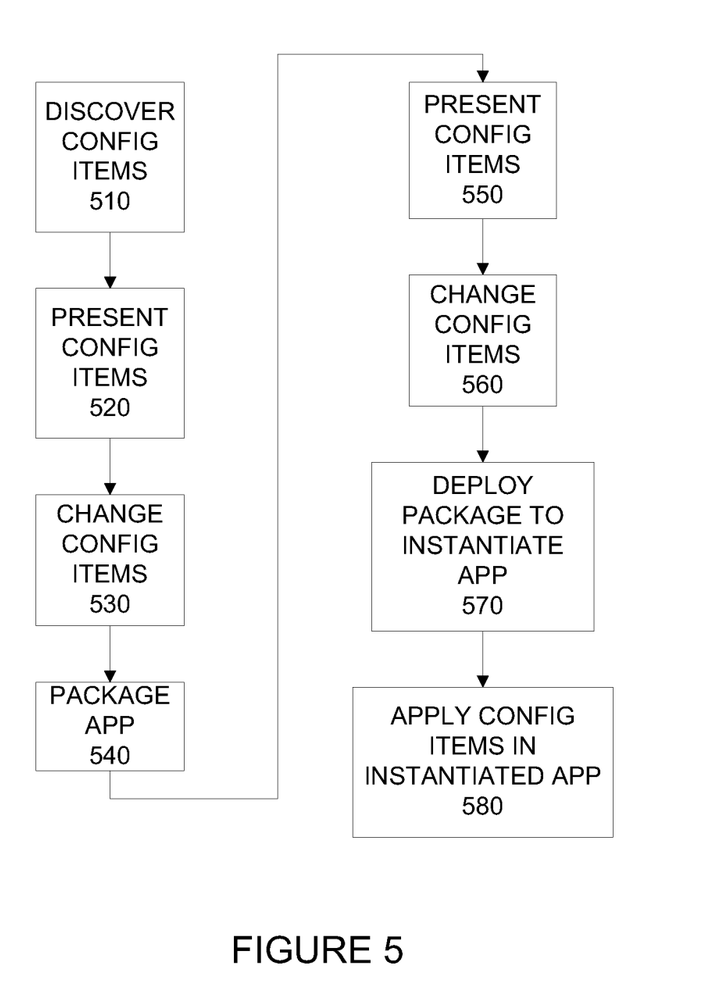
FIG. 5 is a flowchart of yet another virtual application deployment configuration technique.

Referring now to FIG. 5, yet another virtual software application deployment configuration technique will be discussed. The technique can include discovering (510) one or more configuration items for a software application. Some or all of the discovering (510) can be done automatically. The configuration item(s) can be presented (520) on a user interface device and at least one of the configuration item(s) can be changed (530). The changing (530) can be done in response to receiving user input indicating a change.

The application can be packaged (540) to form a virtual application package, but the presentation (520) and changing (530) can be done before packaging (540) is complete. Additionally, the configuration item(s) can be presented (550) with a user interface device after packaging (540) the application. In response to user input indicating a change to a selected configuration item of the configuration item(s), the selected configuration item can be changed (560). The virtual application package can be deployed (570) to instantiate the application, and the configuration item(s) can be applied (580) in the instantiated application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method comprising:
   automatically discovering one or more configuration items for a software application;
   packaging the software application to form a virtual application package;
   deploying the virtual application package to instantiate the software application; and
   applying a deployment configuration comprising one or more settings for the one or more configuration items,
   wherein the deploying the virtual application package and the applying the deployment configuration are interleaved, with a first portion of the virtual application package being deployed as a first deployed portion of the software application and the deployment configuration being applied in the first deployed portion of the software application, followed by a second portion of the virtual application package being deployed as a second deployed portion of the software application and the deployment configuration being applied in the second deployed portion of the software application, and wherein the first portion of the virtual application package is different from the second portion of the virtual application package.

2. The computer-implemented method of claim 1, wherein the one or more configuration items are one or more automatically-discovered configuration items, and the computer-implemented method further comprises discovering one or more manually-discovered configuration items for the software application in response to receiving a user input identifying the one or more manually-discovered configuration items, wherein the deployment configuration comprises one or more settings for the one or more manually-discovered configuration items.

3. The computer-implemented method of claim 1, wherein automatically discovering comprises delegating a first portion of the automatically discovering to a first subsystem relevant to at least one of the one or more configuration items, and delegating a second portion of the automatically discovering to a second subsystem relevant to at least one of the one or more configuration items, and wherein the first portion of the automatically discovering is different from the second portion of the automatically discovering and the first subsystem is different from the second subsystem.

4. The computer-implemented method of claim 1, wherein the deployment configuration is a first deployment configuration, and the computer-implemented method further comprises applying a second deployment configuration in the instantiated software application to change one or more settings for the one or more configuration items, wherein the first deployment configuration is different from the second deployment configuration.

5. The computer-implemented method of claim 1, further comprising presenting the one or more configuration items on a user interface device.

6. The computer-implemented method of claim 5, further comprising receiving a user input, and editing one of the one or more configuration items in response to receiving the user input.

7. The computer-implemented method of claim 6, wherein presenting is done after packaging the software application.

8. The computer-implemented method of claim 1, wherein:
 deploying the virtual application package to instantiate the software application comprises deploying the virtual application package to instantiate the software application as a first instance of the software application;
 applying the deployment configuration comprises applying the deployment configuration in the first instance of the software application; and
 the computer-implemented method further comprises:
  deploying the virtual application package to instantiate the software application as a second instance of the software application; and
  applying the deployment configuration in the second instance of the software application.

9. The computer-implemented method of claim 8, wherein applying the deployment configuration in the first instance of the software application and applying the deployment configuration in the second instance of the software application comprise applying different settings for at least one of the one or more configuration items in the first and second instances of the software application.

10. The computer-implemented method of claim 1, wherein:
 the computer-implemented method further comprises performing the following after packaging the software application:
  presenting the one or more configuration items on a user interface device;
  receiving a user input; and
  editing a setting of at least one of the one or more configuration items in response to receiving the user input;
 deploying the virtual application package to instantiate the software application comprises deploying the virtual application package to instantiate the software application as a first instance of the software application;
 applying the deployment configuration comprises applying the deployment configuration in the first instance of the software application; and
 the computer-implemented method further comprises:
  deploying the virtual application package to instantiate the software application as a second instance of the software application; and
  applying the deployment configuration in the second instance of the software application, wherein different settings are applied for at least one of the one or more configuration items in the first and second instances of the software application.

11. One or more memories having computer-executable instructions embodied thereon that, when executed by at least one processor, cause the at least one processor to perform acts comprising:
 packaging a software application to form a virtual application package;
 setting a deployment configuration comprising one or more configuration items for the virtual application package after packaging the software application;
 deploying the virtual application package to instantiate the software application; and
 applying the deployment configuration,
 wherein the deploying the virtual application package and the applying the deployment configuration are interleaved, with a first portion of the virtual application package being deployed as a first deployed portion of the software application and the deployment configuration being applied in the first deployed portion of the software application, followed by a second portion of the virtual application package being deployed as a second deployed portion of the software application and the deployment configuration being applied in the second deployed portion of the software application, and wherein the first portion of the virtual application package is different from the second portion of the virtual application package.

12. The one or more memories of claim 11, wherein setting the deployment configuration comprises editing the one or more configuration items in the deployment configuration.

13. The one or more memories of claim 11, wherein the acts further comprise discovering the one or more configuration items for the deployment configuration before completing the packaging.

14. The one or more memories of claim 13, wherein the acts further comprise marking at least one of the one or more configuration items as optional or mandatory, and wherein setting the deployment configuration comprises determining for each of the one or more configuration items whether the configuration item is marked as mandatory, and if the configuration item is marked as mandatory, then a user input is required for that configuration item before deploying the virtual application package.

15. The one or more memories of claim 11, wherein:
the deployment configuration is a first deployment configuration;
deploying the virtual application package to instantiate the software application comprises deploying the virtual application package to instantiate the software application in a first instance of the software application;
applying the deployment configuration in the instantiated software application comprises applying the first deployment configuration in the first instance of the software application; and
the acts further comprise:
   setting a second deployment configuration for the virtual application package after packaging the software application;
   deploying the virtual application package to instantiate the software application in a second instance of the software application; and
   applying the second deployment configuration in the second instance of the software application.

16. The computer-readable memory of claim 15, wherein the first instance of the software application is on a first machine with a first machine configuration and the second instance of the software application is on a second machine with a second machine configuration.

17. The computer-readable memory of claim 11, wherein setting the deployment configuration is done in response to receiving a user input.

18. A computer system comprising:
at least one processor; and
at least one memory comprising instructions stored thereon that, when executed by the at least one processor, cause the at least one processor to perform acts comprising:
   discovering one or more configuration items for a software application;
   packaging the software application to form a virtual application package;
   presenting the one or more configuration items on a user interface device after packaging the software application;
   in response to receiving a user input indicating a change to a selected configuration item of the one or more configuration items, changing the selected configuration item;
   deploying the virtual application package to instantiate the software application; and
   applying the one or more configuration items,
   wherein the deploying the virtual application package and the applying the one or more configuration items are interleaved, with a first portion of the virtual application package being deployed as a first deployed portion of the software application and the one or more configuration items being applied in the first deployed portion of the software application followed by a second portion of the virtual application package being deployed as a second deployed portion of the software application and the one or more configuration items being applied in the second deployed portion of the software application, and wherein the first portion of the virtual application package is different from the second portion of the virtual application package.

19. The computer system of claim 18, wherein the acts further comprise:
presenting the one or more configuration items on a user interface device before packaging the software application is complete; and
in response to receiving a user input indicating a change to a selected configuration item of the one or more configuration items, changing the selected configuration item before packaging the software application is complete.

20. The computer system of claim 18, wherein discovering comprises automatically discovering.

* * * * *